(12) United States Patent  
Ri et al.

(10) Patent No.: US 11,456,117 B2
(45) Date of Patent: Sep. 27, 2022

(54) CAPACITOR (71) Applicant: Panasonic Intellectual Property Management Co., Ltd., Osaka (JP)

(72) Inventors: Kakyoku Ri, Osaka (JP); Hiroyuki Kikkawa, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 179 days.

(21) Appl. No.: 16/984,835

(22) Filed: Aug. 4, 2020

(65) Prior Publication Data

US 2020/0365324 A1 Nov. 19, 2020

Related U.S. Application Data (63) Continuation of application No. PCT/JP2018/046002, filed on Dec. 14, 2018.

(30) Foreign Application Priority Data

Feb. 27, 2018 (JP) .............................. JP2018-033956

(51) Int. Cl.
*H01G 2/10* (2006.01)
*H01G 4/005* (2006.01)
(Continued)

(52) U.S. Cl.
CPC .............. *H01G 4/228* (2013.01); *H01G 2/10* (2013.01); *H01G 4/005* (2013.01); *H01G 4/224* (2013.01); *H01G 4/30* (2013.01); *H01G 4/33* (2013.01)

(58) Field of Classification Search
CPC ............ H01G 2/10; H01G 2/04; H01G 2/106; H01G 2/103; H01G 4/005; H01G 4/224; (Continued)

(56) References Cited

U.S. PATENT DOCUMENTS

2015/0380713 A1* 12/2015 Kimura ................. H01G 11/76
429/121
2017/0207027 A1 7/2017 Sato et al.

FOREIGN PATENT DOCUMENTS

CN 103325569 A * 9/2013 ............... H01G 4/38
JP 6-104140 4/1994
(Continued)

OTHER PUBLICATIONS

Expansion and Contraction_pp. 210-237_May 2017.*
(Continued)

*Primary Examiner* — Timothy J Thompson
*Assistant Examiner* — Guillermo J Egoavil
(74) *Attorney, Agent, or Firm* — McDermott Will & Emery LLP (57) ABSTRACT A capacitor includes a capacitor element having an end surface and a peripheral surface, an electrode disposed on the end surface, and a bus bar connected to the electrode. The bus bar includes a bus bar main body and at least one electrode connection terminal part provided at an edge part of the bus bar main body. The at least one electrode connection terminal part includes a connecting part and an elastic shape part. The connecting part is connected to the electrode at a tip of the at least one electrode connection terminal part. The elastic shape part is disposed between the edge part and the connecting part. The elastic shape part has a shape that is elastically deformable so that the elastic shape part shrinks in accordance with thermal expansion of the bus bar main body, and the elastic shape part extends in accordance with thermal shrinkage of the bus bar main body.

6 Claims, 7 Drawing Sheets (51) Int. Cl.
  *H01G 4/224* (2006.01)
  *H01G 4/228* (2006.01)
  *H01G 4/30* (2006.01)
  *H01G 4/33* (2006.01)

(58) Field of Classification Search
  CPC ............ H01G 4/228; H01G 4/30; H01G 4/32; H01G 4/33; H05G 5/02
  USPC .............................................. 361/301.1, 500
  See application file for complete search history.

(56) References Cited

FOREIGN PATENT DOCUMENTS

| | | |
|---|---|---|
| JP | 10-041190 | 2/1998 |
| JP | 2014-138082 | 7/2014 |
| WO | 2016/027462 | 2/2016 |

OTHER PUBLICATIONS

Thermal—Wikipedia—pp. 1-21_Apr. 2015_2017.*
International Search Report of PCT application No. PCT/JP2018/046002 dated Feb. 12, 2019.

* cited by examiner

CAPACITOR

RELATED APPLICATIONS

This application is a continuation of the PCT International Application No. PCT/JP2018/046002 filed on Dec. 14, 2018, which claims the benefit of foreign priority of Japanese patent application No. 2018-033956 filed on Feb. 27, 2018, the contents all of which are incorporated herein by reference.

BACKGROUND

1. Technical Field

The present disclosure relates to a capacitor such as a film capacitor.

2. Description of the Related Art

Unexamined Japanese Patent Publication No. 2014-138082 discloses a film capacitor in which a capacitor element with a bus bar connected to an extraction electrode on each of both end surfaces is housed in a resin case, and the resin case is filled with a filler resin. The bus bar is formed in a plate shape, and has a part that covers a side surface (peripheral surface) of the capacitor element, and a part that covers the extraction electrode. The part that covers the extraction electrode has a connecting part at an end of the part, and the connecting part is connected to the extraction electrode. An external connecting part for extracting an electrode to outside is connected to the bus bar.

In addition, Unexamined Japanese Patent Publication No. 10-41190 discloses a capacitor element assembly including a connecting fitting having a plurality of electrode lead parts. In the capacitor element assembly, a tip connecting part at a tip of the electrode lead part is connected to the element electrode part at each of both end surfaces of the capacitor element by soldering. And for absorbing and relaxing stress from fracture energy generated in a direction of peeling of the electrode lead part from the element electrode part (direction perpendicular to a surface of the element electrode part) if the capacitor element is fractured in a state of being short-circuited between electrodes, the electrode lead part is configured to be stretchable in the peeling direction.

SUMMARY

A capacitor according to a main aspect of the present disclosure includes a capacitor element having an end surface and a peripheral surface, an electrode disposed on the end surface, and a bus bar made of a metal and connected to the electrode. Here, the bus bar includes a bus bar main body and at least one electrode connection terminal part provided at an edge part of the bus bar main body. The edge part is at a side close to the electrode. The at least one electrode connection terminal part has a width smaller than a width of the bus bar main body, and extends from the edge part in a first direction parallel to a surface of the electrode. And the at least one electrode connection terminal part includes a connecting part and an elastic shape part. The connecting part is connected to the electrode at a tip of the at least one electrode connection terminal part. The elastic shape part is disposed between the edge part and the connecting part. Further, the elastic shape part has a shape that is elastically deformable so that the elastic shape part shrinks along a direction in which the edge part approaches the connecting part in accordance with thermal expansion of the bus bar, and the elastic shape part extends along a direction in which the edge part moves away from the connecting part in accordance with thermal shrinkage of the bus bar main body.

According to the present disclosure, it is possible to provide a capacitor that hardly undergoes defective connection between the bus bar and the electrode due to stress caused by extension and shrinkage of the bus bar in a direction parallel to a surface of the electrode.

The effects and purposes of the present disclosure will become more apparent from an exemplary embodiment described below. However, the exemplary embodiment described below is merely an example of carrying out the present disclosure, and the present disclosure is not limited to the exemplary embodiment described below.

DETAILED DESCRIPTION OF EMBODIMENT

In recent years, capacitors have been used for a device such as a power conversion device, which installed in engine rooms in vehicle applications, and thus capacitors have been required to have higher heat resistance than ever before.

When a film capacitor in Unexamined Japanese Patent Publication No. 2014-138082 is exposed to the above-mentioned high-temperature environment, resulting in elevation of a temperature of a film capacitor, a part covering an extraction electrode of a bus bar may expand in a direction parallel to a surface of the extraction electrode due to the temperature change. When the part covering the extraction electrode is directed to expand in a direction connecting between the part covering the extraction electrode of the bus bar and the connecting part, the extension of the part is restricted by the connecting part on a side of the connecting part of the bus bar, and restricted by a filler resin deposited on a part covering a side surface (peripheral surface) of the capacitor element on a side opposite to the connecting part of the bus bar. Hence, stress generated by the extension of the part covering the extraction electrode of the bus bar toward the connecting part may act on the connecting part, and thus the stress may cause cracks between the extraction electrode and the connecting part, or detachment of the extraction electrode from the connecting part.

When the bus bar is configured such that the part covering the extraction electrode does not bend inside the filler resin, and extends straight to outside the filler resin unlike that configuration in Unexamined Japanese Patent Publication No. 2014-138082, the extension of the part covering the extraction electrode is unlikely to be restricted by the filler resin. However, since the external connecting part is connected to an external terminal provided in an external device, the extension of the bus bar at a side opposite to the connecting part is restricted by the external connecting part. Hence, even in such a configuration of the bus bar, stress generated by the extension of the bus bar toward the connecting part in a direction parallel to the surface of the extraction electrode may act on the connecting part.

Similarly, when a film capacitor is mounted in a vehicle used in a cold district, the film capacitor may be exposed to a low temperature. In such a case, stress generated by shrinkage of the bus bar in a direction parallel to the surface of the extraction electrode from the connecting part side may act, and thus the stress may cause cracks between the extraction electrode and the connecting part, or detachment of the extraction electrode from the connecting part.

The configuration in Unexamined Japanese Patent Publication No. 10-41190 is not intended to relax stress generated in a direction parallel to the surface of the extraction electrode due to extension and shrinkage of the bus bar in the direction parallel to the surface of the extraction electrode.

In view of such problems, the present disclosure provides a capacitor that hardly undergoes defective connection between the bus bar and the electrode due to stress caused by extension and shrinkage of the bus bar in a direction parallel to a surface of the electrode.

Hereinafter, an exemplary embodiment of the present disclosure will be described with reference to the drawings. For convenience, a front-rear direction, a left-right direction and an up-down direction are appropriately added in the drawings. It is to be noted that the directions shown in the drawings merely indicate relative directions of film capacitor 1 etc., and do not indicate absolute directions.

In the exemplary embodiment, film capacitor 1 corresponds to a "capacitor" described in claims End-face electrode 11 corresponds to an "electrode" described in claims. Further, lower edge part 21a corresponds to an "edge part" described in the claims.

However, the above descriptions are merely intended to associate the configuration in claims with the configuration in the exemplary embodiment, and the association does not limit the disclosure of claims to the configuration in the exemplary embodiment.

Figure 1A:
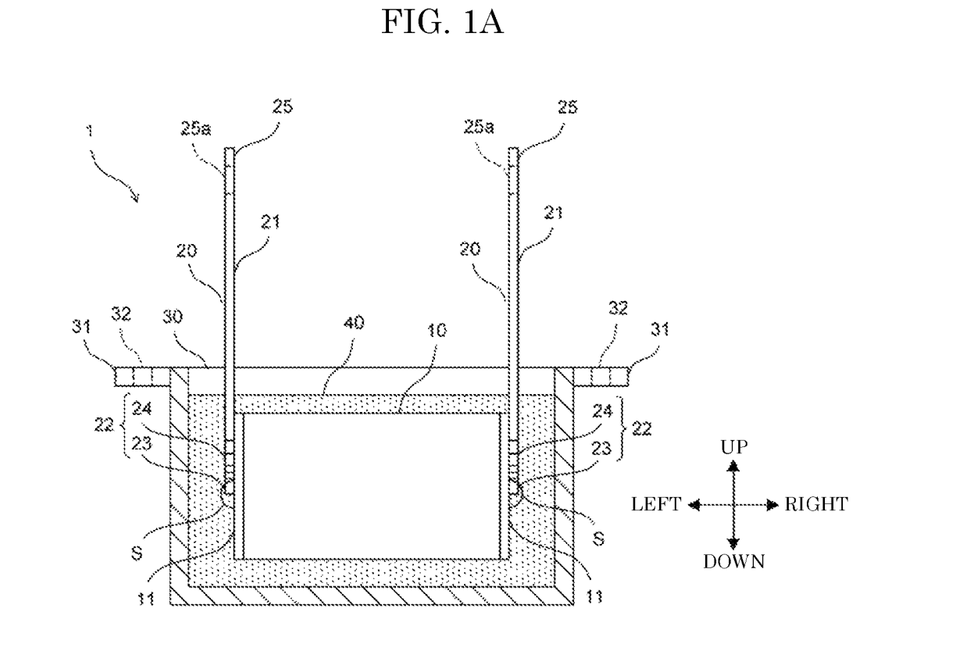
FIG. 1A is a front sectional view of a film capacitor cut in a left-right direction at a position on a front side of a capacitor element according to an exemplary embodiment.
Figure 1B:
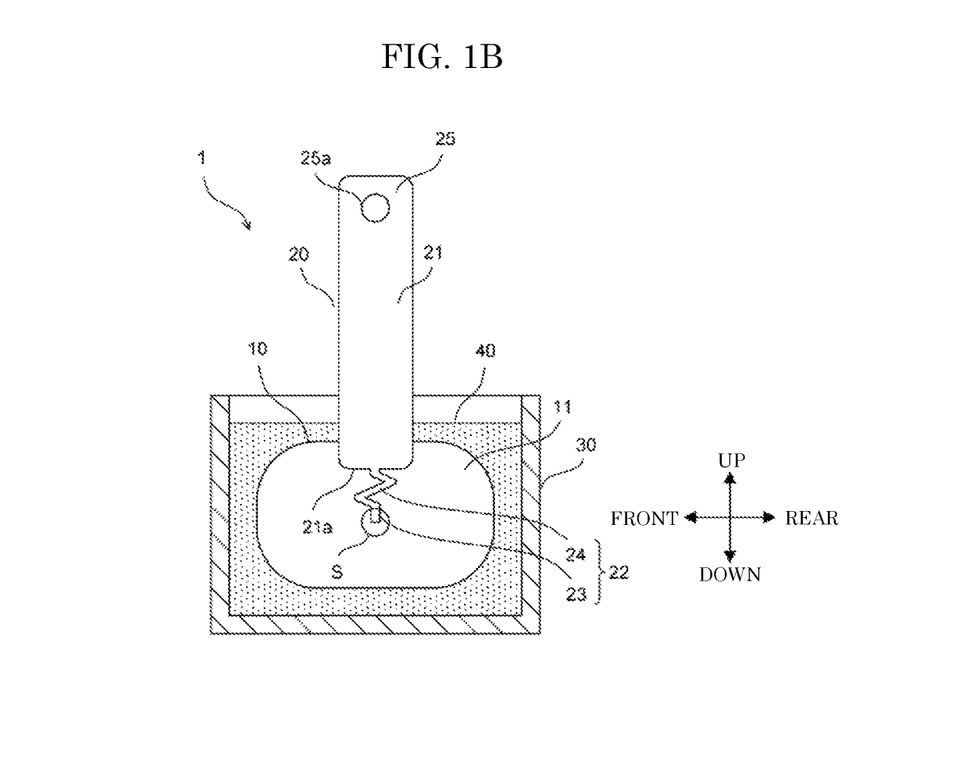
FIG. 1B is a side sectional view of a film capacitor cut in a front-rear direction at a position on a right side of a capacitor element according to an exemplary embodiment.

FIG. 1A is a front sectional view of film capacitor 1 cut in a left-right direction at a position on a front side of capacitor element 10 according to the exemplary embodiment. FIG. 1B is a side sectional view of film capacitor 1 cut in a front-rear direction at a position on a right side of capacitor element 10 according to an exemplary embodiment. In FIGS. 1A and 1B, solder S appears transparent for convenience. The same applies to FIGS. 3A and 3B and FIGS. 4A and 4B.

Film capacitor 1 of the exemplary embodiment can be mounted in an external device that is placed under a high-temperature environment, e.g. a device in an engine room of an automobile, such as an in-vehicle power conversion device. Thus, film capacitor 1 is excellent in heat resistance, and can have a heatproof temperature of, for example, 105° C. or higher.

Film capacitor 1 includes capacitor element 10, a pair of bus bars 20, case 30 and mold resin 40.

Capacitor element 10 is formed in the following manner: two metalized films each having aluminum vapor-deposited on a dielectric film are stacked, and the stacked metalized films are wound or laminated, and pressed in a flat shape. Capacitor element 10 has end-face electrodes 11 formed on both end surfaces by spraying a metal such as zinc.

Capacitor element 10 in the exemplary embodiment is formed from metalized films each having aluminum vapor-deposited on a dielectric film. Alternatively, capacitor element 10 may be formed from metalized films obtained by vapor-depositing another metal such as zinc or magnesium. Alternatively, capacitor element 10 may be formed from metalized films obtained by vapor-depositing two or more of the above-mentioned metals, or may be formed from metalized films obtained by vapor-depositing an alloy of the above-mentioned metals.

Bus bar 20 is made of a metallic material having electric conductivity, such as copper, and includes bus bar main body 21 and electrode connection terminal part 22. Bus bar main body 21 has a rectangular plate shape with a long side extending in an up-down direction, and is disposed in parallel to a surface of end-face electrode 11. Electrode connection terminal part 22 is provided at lower edge part 21a of bus bar main body 21, which is positioned at a side close to the end-face electrode 11 of capacitor element 10, and is disposed in parallel to a surface of end-face electrode 11 so as to extend in an up-down direction. Electrode connection terminal part 22 is positioned at a center of lower edge part 21a of bus bar main body 21 in a front-rear direction. The up-down direction is a direction (first direction) in which electrode connection terminal part 22 extends. The front-rear direction is a direction (second direction) parallel to the surface of end-face electrode 11 and perpendicular to a direction (first direction) in which electrode connection terminal part 22 extends.

Electrode connection terminal part 22 has a width smaller than a width (a dimension in the front-rear direction) of bus bar main body 21 and larger than a thickness of bus bar main body 21. Electrode connection terminal part 22 includes a connecting part 23 extending straight downward at a tip of electrode connection terminal part 22. Electrode connection terminal part 22 includes elastic shape part 24 disposed between lower edge part 21a of bus bar main body 21 and connecting part 23. Elastic shape part 24 has a triangular wave shape undulating in a front-rear direction, and has elasticity (stretchable) in an up-down direction. Connecting part 23 is connected and fixed to end-face electrode 11 by solder S. A length of connecting part 23 is set in such a manner that solder S covers only a region of connecting part 23, and does not contact elastic shape part 24.

An upper end part of bus bar main body 21 functions as external connection terminal part 25 used for connecting to an external terminal. And through-hole 25a is provided in the upper end part. The external connection terminal part 25 is provided on a plane flush with lower edge part 21a of bus bar main body 21.

Case 30 is made of resin, for example, polyphenylene sulfide (PPS) resin that is a thermoplastic resin. Case 30 has a substantially rectangular parallelepiped box shape, and is opened at an upper surface. Case 30 includes fixing part 31 provided on an upper part of each of a left side surface and a right side surface. Circular fixing hole 32 penetrating in an up-down direction is formed in fixing part 31.

Mold resin 40 includes a thermosetting resin such as an epoxy resin, and is injected into case 30 in a molten state, and cured by heating case 30. Mold resin 40 covers capacitor element 10 and a part of each of a pair of bus bars 20 to protect these components from moisture and impacts.

When film capacitor 1 is installed in an external device, fixing part 31 of case 30 is fixed to the fixing part provided in the external device by a bolt extending through fixing hole 32. A pair of external terminals provided in the external device are respectively connected to external connection terminal parts 25 of a pair of bus bars 20 by bolting at through-holes 25a.

Figure 2A:
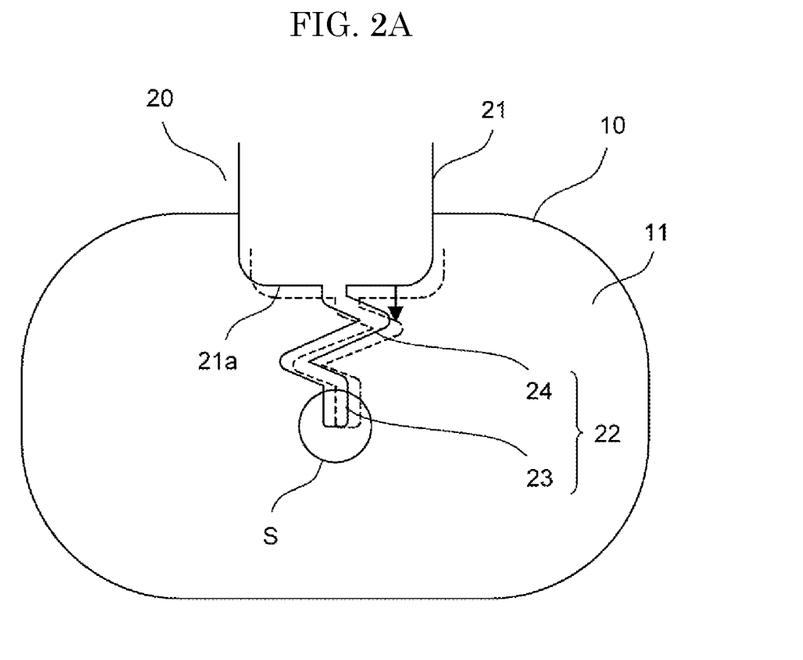
FIG. 2A is a diagram for explaining a state of a bus bar when a film capacitor installed in an external device is at a high temperature according to the exemplary embodiment.
Figure 2B:
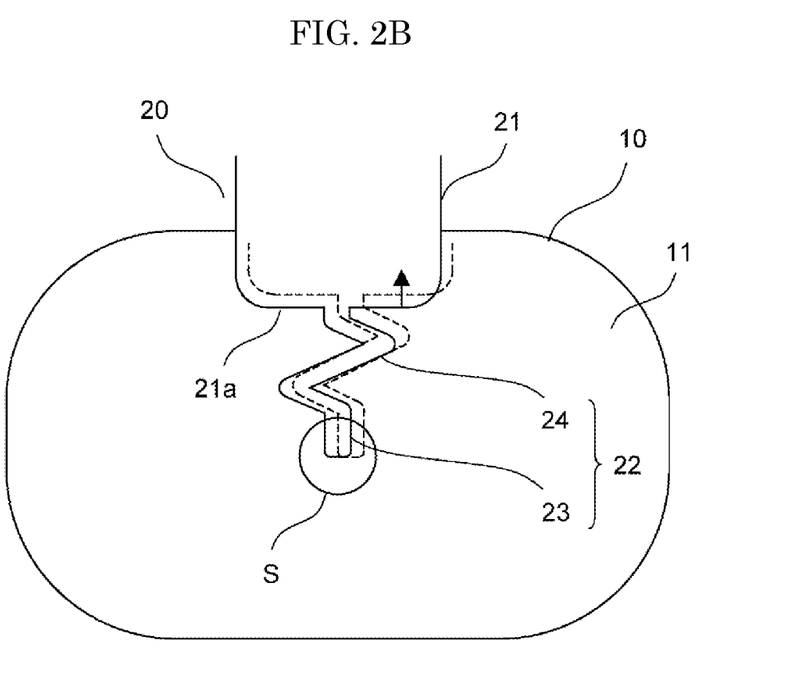
FIG. 2B is a diagram for explaining a state of a bus bar when the film capacitor installed in the external device is at a low temperature according to the exemplary embodiment.

FIG. 2A is a diagram for explaining a state of bus bar 20 when film capacitor 1 installed in the external device is at a high temperature according to the exemplary embodiment. And FIG. 2B is a diagram for explaining a state of bus bar 20 when film capacitor 1 installed in the external device is at a low temperature according to the exemplary embodiment. In FIGS. 2A and 2B, for convenience, bus bar 20 after extension and shrinkage (broken line) is illustrated to be slightly laterally shift from bus bar 20 before extension and shrinkage (solid line), and an extension and shrinkage amount of bus bar 20 is illustrated to be larger than a real amount of the extension and shrinkage.

When film capacitor 1 becomes a high temperature, the temperature change causes bus bar 20, i.e. bus bar main body 21, to expand. When the film capacitor 1 becomes a low temperature, the temperature change causes bus bar main body 21 to shrink. Bus bar main body 21 is long in an up-down direction that is a direction in which bus bar main body 21 and electrode connection terminal part 22 are arranged, and bus bar main body 21 easily extends or shrinks in the up-down direction due to thermal expansion and thermal shrinkage.

In bus bar main body 21, since the upper end part, i.e. external connection terminal part 25 is fixed to the external terminal, upward extension or downward shrinkage in accordance with thermal expansion or thermal shrinkage is restricted. Hence, when thermal expansion occurs, as shown in FIG. 2A, bus bar main body 21 extends downward, and lower edge part 21a of bus bar main body 21 moves toward electrode connection terminal part 22. Here, in electrode connection terminal part 22, elastic shape part 24 is elastically deformed so as to shrink in accordance with movement of lower edge part 21a of bus bar main body 21 and in a moving direction of lower edge part 21a. This ensures that elastic shape part 24 absorbs stress generated by extension of bus bar main body 21, which is directed downward, so that stress acting on connecting part 23 and solder S via connecting part 23 is relaxed. Similarly, when thermal shrinkage occurs, as shown in FIG. 2B, bus bar main body 21 shrinks upward, and lower edge part 21a of bus bar main body 21 moves away from electrode connection terminal part 22. Here, in electrode connection terminal part 22, elastic shape part 24 is elastically deformed so as to extend in accordance with movement of lower edge part 21a of bus bar main body 21 and in a moving direction of lower edge part 21a. This ensures that elastic shape part 24 absorbs stress generated by shrinkage of bus bar main body 21, which is directed upward, so that stress acting on solder S via connecting part 23 is relaxed.

Electrode connection terminal part 22 is positioned at a center of lower edge part 21a of bus bar main body 21 in a front-rear direction. Hence, when bus bar main body 21 extends or shrinks, bending stress is unlikely to be generated on a root portion of electrode connection terminal part 22 (a portion connecting to bus bar main body 21).

Effects of Exemplary Embodiment

According to the configuration of film capacitor 1 of the exemplary embodiment, it is possible to exhibit effects below.

When film capacitor 1 is at a high or low temperature, the temperature change causes bus bar main body 21 to expand or shrink. In particular, bus bar main body 21 easily extends or shrinks in a longitudinal direction because bus bar main body 21 and electrode connection terminal part 22 are arranged in the longitudinal direction. Bus bar main body 21 includes external connection terminal part 25 on a plane flush with lower edge part 21a provided with electrode connection terminal part 22. Since external connection terminal part 25 is connected to the external terminal to be fixed on the external device, bus bar main body 21 tends to extend or shrink so as to move the lower edge part 21a, i.e. a part at a side close to the electrode connection terminal part 22. Hence, stress acting on connecting part 23 of electrode connection terminal part 22 and solder S tends to be large.

In the exemplary embodiment, an elastic deformation of elastic shape part 24 can absorb stress generated by extension or shrinkage of bus bar main body 21 in a direction parallel to a surface of end-face electrode 11 due to a temperature change. Hence, stress on connecting part 23 of electrode connection terminal part 22 and solder S can be relaxed. This enables to suppress generation of cracks between solder S and end-face electrode 11 and detachment of connecting part 23 from end-face electrode 11 together with solder S.

In the exemplary embodiment, electrode connection terminal part 22 is positioned at a center of lower edge part 21a of bus bar main body 21 in a front-rear direction. Hence, when bus bar main body 21 extends or shrinks, bending stress is unlikely to be generated on a root portion of electrode connection terminal part 22, so that deformation, breakage or the like of the root portion can be suppressed.

Further, in the exemplary embodiment, solder S covers only a region of connecting part 23 and does not contact elastic shape part 24. Hence, it is possible to prevent a situation in which it is difficult for elastic shape part 24 to be elastically deformed because elastic shape part 24 is partially solidified with solder S.

While the exemplary embodiment of the present disclosure has been described above, the present disclosure is not limited to the exemplary embodiment, and various changes can be made to the exemplary embodiment as well as application examples of the present disclosure.

<Modification 1>

Figure 3A:
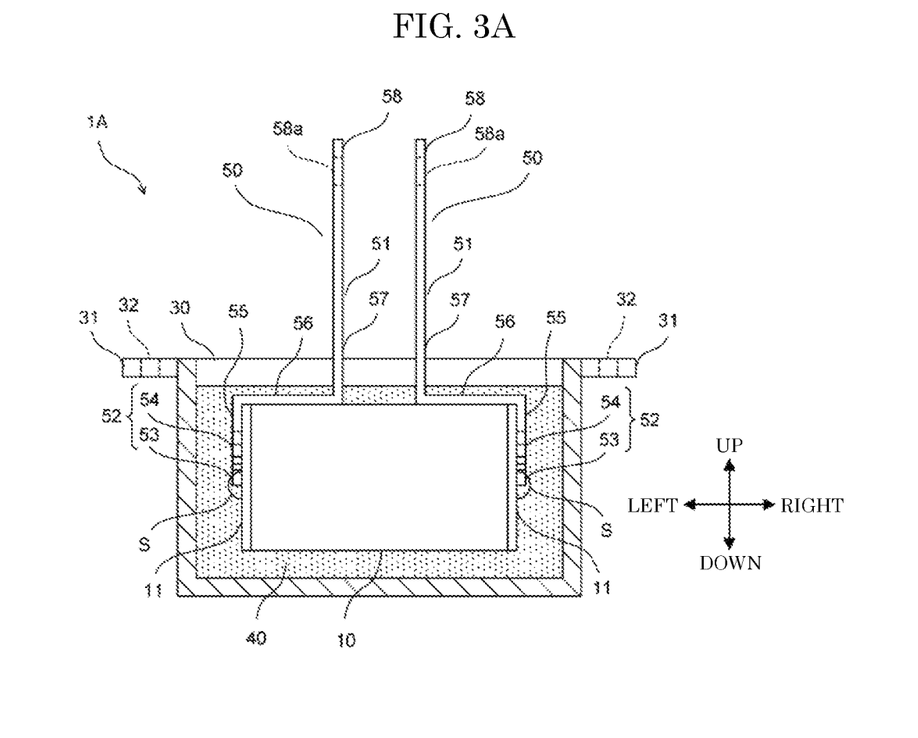
FIG. 3A is a front sectional view of a film capacitor cut in a left-right direction at a position on a front side of a capacitor element according to modification 1.
Figure 3B:
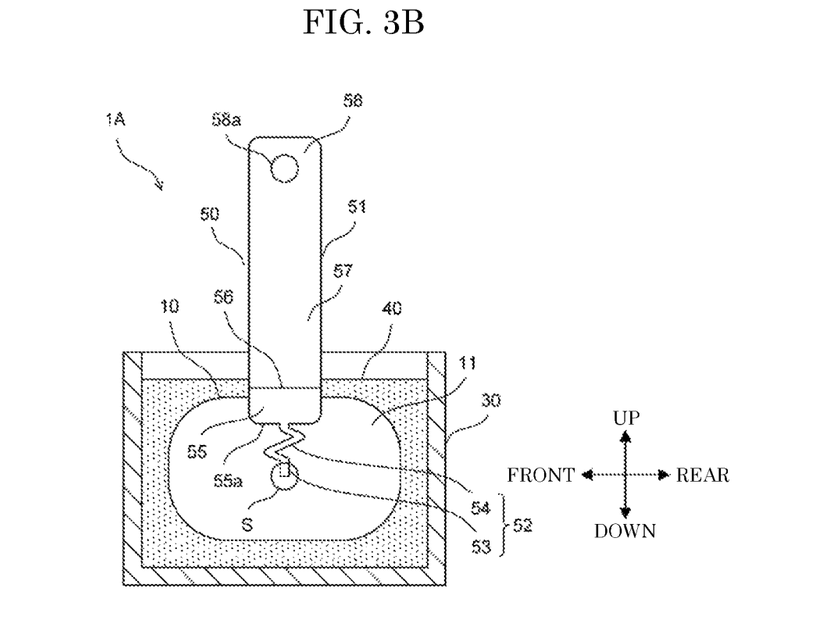
FIG. 3B is a side sectional view of a film capacitor cut in a front-rear direction at a position on a right side of a capacitor element according to modification 1.

FIG. 3A is a front sectional view of film capacitor 1A cut in a left-right direction at a position on a front side of capacitor element 10 according to modification 1. FIG. 3B is a side sectional view of film capacitor 1A cut in a front-rear direction at a position on a right side of capacitor element 10 according to modification 1.

In the modification, film capacitor 1A corresponds to a "capacitor" described in claims. Lower edge part 55a corresponds to an "edge part" described in the claims.

Film capacitor 1A of the modification includes a pair of bus bars 50 different from a pair of bus bars 20 of the above-described exemplary embodiment. For other configurations, film capacitor 1A is similar to film capacitor 1 of the above-described exemplary embodiment.

Bus bar 50 is made of a metallic material having electric conductivity, such as copper, and includes bus bar main body 51 and electrode connection terminal part 52. Electrode connection terminal part 52 is identical in configuration to electrode connection terminal part 22 of the above-described exemplary embodiment, and includes connecting part 53 and elastic shape part 54. Connecting part 53 is connected and fixed to end-face electrode 11 by solder S. Solder S covers only a region of connecting part 53, and does not contact elastic shape part 54.

Bus bar main body 51 includes first flat plate part 55, second flat plate part 56 and third flat plate part 57. First flat plate part 55 extends parallel to the surface of end-face electrode 11, and covers end-face electrode 11. Second flat plate part 56 is bent with respect to first flat plate part 55, and extends along a peripheral surface of capacitor element 10. Third flat plate part 57 is bent with respect to second flat plate part 56, extends away from the peripheral surface of capacitor element 10 (upward) to be exposed from mold resin 40. Electrode connection terminal part 52 is provided at a center of lower edge part 55a of first flat plate part 55 in a front-rear direction. An upper end part of third flat plate part 57 functions as external connection terminal part 58 used for connecting to an external terminal. And the upper end part has through-hole 58a.

When film capacitor 1A is at a high temperature, the temperature change causes bus bar 50, i.e. bus bar main body 51, to expand. When the film capacitor 1A is at a low temperature, the temperature change causes bus bar main body 51 to shrink.

In bus bar main body 51, first flat plate part 55 extends or shrinks in an up-down direction along the surface of end-face electrode 11. However, upward extension of first flat plate part 55 is restricted by mold resin 40 deposited on second flat plate part 56. Further, since second flat plate part 56 is in contact with the peripheral surface of capacitor element 10, downward shrinkage of first flat plate part 55 is restricted. Thus, when thermal expansion occurs in bus bar main body 51, first flat plate part 55 extends downward, and lower edge part 55a of first flat plate part 55 moves toward electrode connection terminal part 52. Here, in electrode connection terminal part 52, elastic shape part 54 is elastically deformed so as to shrink in accordance with movement of lower edge part 55a of first flat plate part 55 and in a moving direction of lower edge part 55a. This ensures that elastic shape part 54 absorbs stress generated by extension of first flat plate part 55, which is directed downward, so that stress acting on connecting part 53 and solder S via connecting part 53 is relaxed. Similarly, when thermal shrinkage occurs in bus bar main body 51, first flat plate part 55 shrinks upward, and lower edge part 55a of first flat plate part 55 moves away from electrode connection terminal part 52. Here, in electrode connection terminal part 52, elastic shape part 54 is elastically deformed so as to extend in accordance with movement of lower edge part 55a of first flat plate part 55 and in a moving direction of lower edge part 55a. This ensures that elastic shape part 54 absorbs stress generated by shrinkage of first flat plate part 55, which is directed upward, so that stress acting on connecting part 53 and solder S through connecting part 53 is relaxed.

In film capacitor 1A of the modification, bus bar main body 51 includes first flat plate part 55 covering end-face electrode 11, and second flat plate part 56 that is bent from first flat plate part 55 and covers the peripheral surface of capacitor element 10. Extension or shrinkage of first flat plate part 55 on an upper side is restricted, so that extension or shrinkage tends to occur so as to move the lower edge part 55a, i.e. a part at a side close to the electrode connection terminal part 52. Hence, stress acting on connecting part 53 of electrode connection terminal part 52 and solder S tends to be large. However, in the modification, stress on connecting part 53 of electrode connection terminal part 52 and solder S can be relaxed by absorption of stress at elastic shape part 54 as in the above-described exemplary embodiment because elastic shape part 54 is provided on electrode connection terminal part 52.

<Modification 2>

Figure 4A:
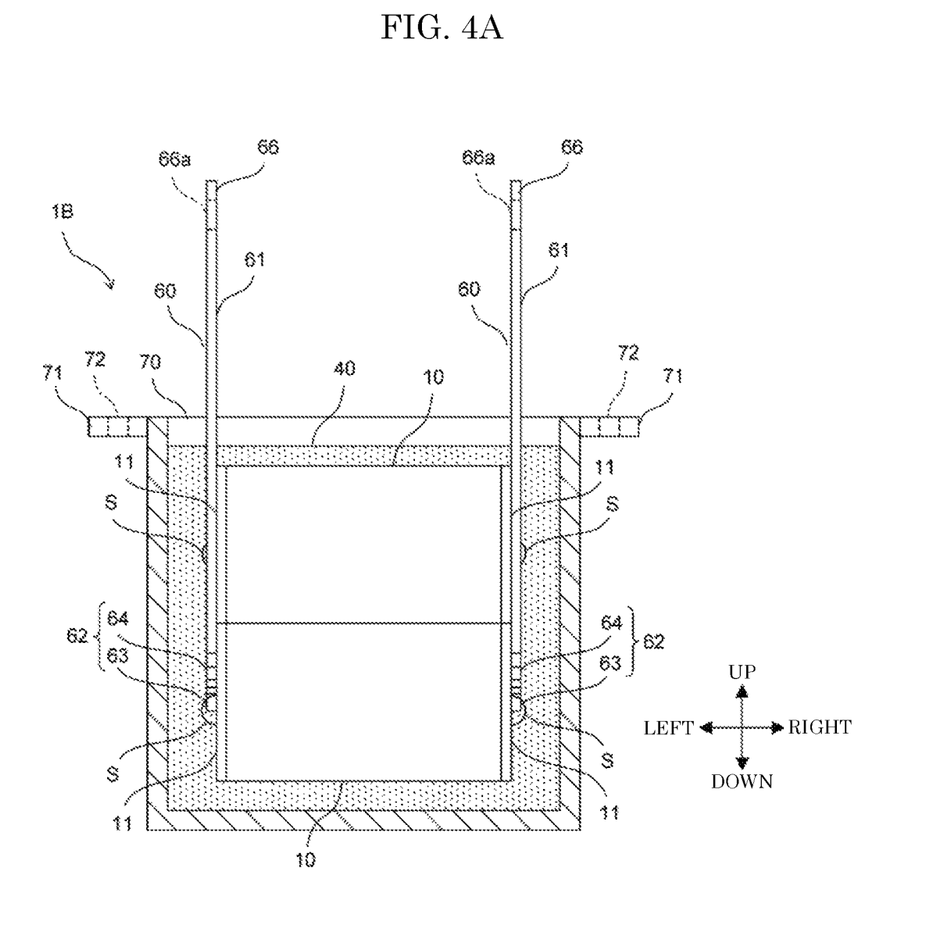
FIG. 4A is a front sectional view of a film capacitor cut in a left-right direction at a position on a front side of a capacitor element according to modification 2.
Figure 4B:
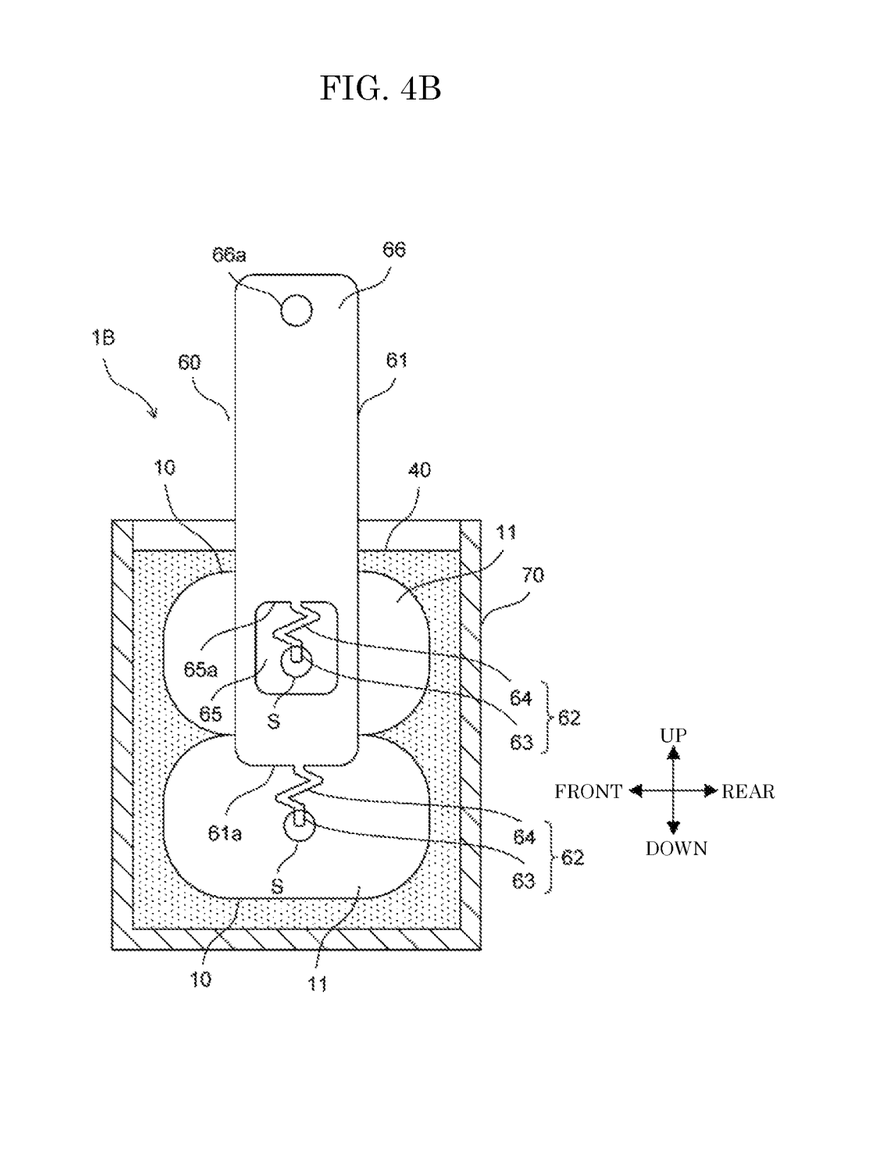
FIG. 4B is a side sectional view of a film capacitor cut in a front-rear direction at a position on a right side of a capacitor element according to modification 2.

FIG. 4A is a front sectional view of film capacitor 1B cut in a left-right direction at a position on a front side of capacitor element 10 according to modification 2. FIG. 4B is a side sectional view of film capacitor 1B cut in a front-rear direction at a position on a right side of capacitor element 10 according to modification 2.

In the modification, film capacitor 1B corresponds to a "capacitor" described in claims Lower edge part 61a upper edge part a65 correspond to an "edge part" described in the claims.

In the film capacitor 1B of the modification, two capacitor elements 10 are used. Thus, film capacitor 1B includes a pair of bus bars 60 and case 70 different from a pair of bus bars 20 and case 30 in the above-described exemplary embodiment.

Case 70 is made of resin. Case 70 is formed in a substantially rectangular parallelepiped box shape having a depth larger than that of case 30 in the above-described exemplary embodiment, and includes fixing part 71 having fixing holes 72 at upper parts of a left side surface and a right side surface. Two capacitor elements 10 are housed in case 70 so as to be arranged in an up-down direction.

Bus bar 60 is made of a metallic material having electric conductivity, such as copper, and includes bus bar main body 61 and two electrode connection terminal parts 62. Electrode connection terminal part 62 is identical in configuration to electrode connection terminal part 22 of the above-described exemplary embodiment, and includes connecting part 63 and elastic shape part 64.

Bus bar main body 61 has a rectangular plate shape long in an up-down direction, and extends parallel to surfaces of end-face electrodes 11 of two capacitor elements 10. Bus bar main body 61 has opening part 65 formed at a position corresponding to end-face electrode 11 of upper capacitor element 10. One of two electrode connection terminal parts 62 is provided at a center of upper edge part 65a of opening part 65 in a front-rear direction. Another one of two electrode connection terminal parts 62 is provided at a center of lower edge part 61a of bus bar main body 61 in a front-rear direction. Connecting part 63 of the one of two electrode connection terminal parts 62 is connected and fixed to end-face electrode 11 of upper capacitor element 10 by solder S. And connecting part 63 of the another one of two electrode connection terminal parts 62 is connected to end-face electrode 11 of lower capacitor element 10 by solder S. Solder S covers only a region of connecting part 63, and does not contact elastic shape part 64. An upper end part of bus bar main body 61 functions as external connection terminal part 66 used for connecting to an external terminal. And the upper end part has through-hole 66a.

In film capacitor 1B of the modification, two electrode connection terminal parts 62 each includes elastic shape part 64. Hence, when thermal expansion or thermal shrinkage causes bus bar main body 61 to extend or shrink in an up-down direction along surfaces of end-face electrodes 11 of two capacitor elements 10, stress generated by the extension or shrinkage can be absorbed by elastic deformation of elastic shape part 64 as in the above-described exemplary embodiment. This enables relaxation of stress on connecting part 63 of electrode connection terminal part 62 and solder S.

<Modification 3>

Figure 5:
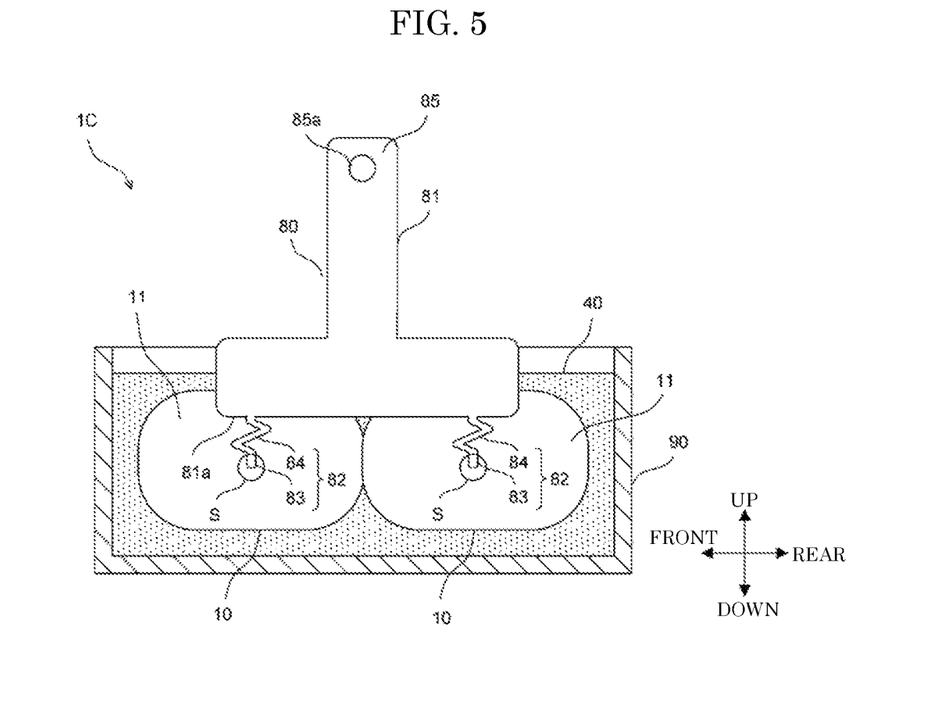
FIG. 5 is a side sectional view of a film capacitor cut in a front-rear direction at a position on a right side of a capacitor element according to modification 3.

FIG. 5 is a side sectional view of film capacitor 1C cut in a front-rear direction at a position on a right side of capacitor element 10 according to modification 3.

In the modification, film capacitor 1C corresponds to a "capacitor" described in claims. Lower edge part 81a corresponds to an "edge part" described in the claims.

Film capacitor 1C of the modification includes a pair of bus bars 80 connected to two capacitor elements 10 arranged in a front-rear direction, and case 90 in which two capacitor elements 10 are housed.

Case 90 is made of resin. Case 90 is formed in a substantially rectangular parallelepiped box shape having a length in the front-rear direction larger than that of case 30 in the above-described exemplary embodiment.

Bus bar 80 is made of a metallic material having electric conductivity, such as copper, and includes bus bar main body 81 and two electrode connection terminal parts 82. Electrode connection terminal part 82 is identical in configuration to electrode connection terminal part 22 of the above-described exemplary embodiment, and includes connecting part 83 and elastic shape part 84.

Bus bar main body 81 has an inverted T-shape in which a lower part has a large width. Electrode connection terminal part 82 is provided at each of two positions symmetrical to each other with respect to a center of lower edge part 81a of bus bar main body 81 in a front-rear direction. Connecting part 83 of one of two electrode connection terminal parts 82 is connected and fixed to end-face electrode 11 of front capacitor element 10 by solder S. And connecting part 83 of another one of two electrode connection terminal parts 82 is connected to end-face electrode 11 of rear capacitor element 10 by solder S. Solder S covers only a region of connecting part 83, and does not contact elastic shape part 84. An upper end part of bus bar main body 81 functions as external connection terminal part 85 used for connection to an external terminal. And the upper end part has through-hole 85a.

In film capacitor 1C of the modification, two electrode connection terminal parts 82 each includes elastic shape part 84. Hence, when thermal expansion or thermal shrinkage causes bus bar main body 81 to extend or shrink in an up-down direction along surfaces of end-face electrodes 11 of two capacitor elements 10, stress generated by the extension or shrinkage can be absorbed by elastic deformation of elastic shape part 84 as in the above-described exemplary embodiment. This enables relaxation of stress on connecting part 83 of electrode connection terminal part 82 and solder S.

Two electrode connection terminal parts 82 are provided at positions symmetrical to each other with respect to a center at lower edge part 81a of bus bar main body 81. Hence, bending stress is unlikely to be generated on a root portion of each of two electrode connection terminal parts 82 during extension or shrinkage of bus bar main body 81, so that deformation, breakage or the like of the root area can be suppressed.

<Other Modifications>

Figure 6:
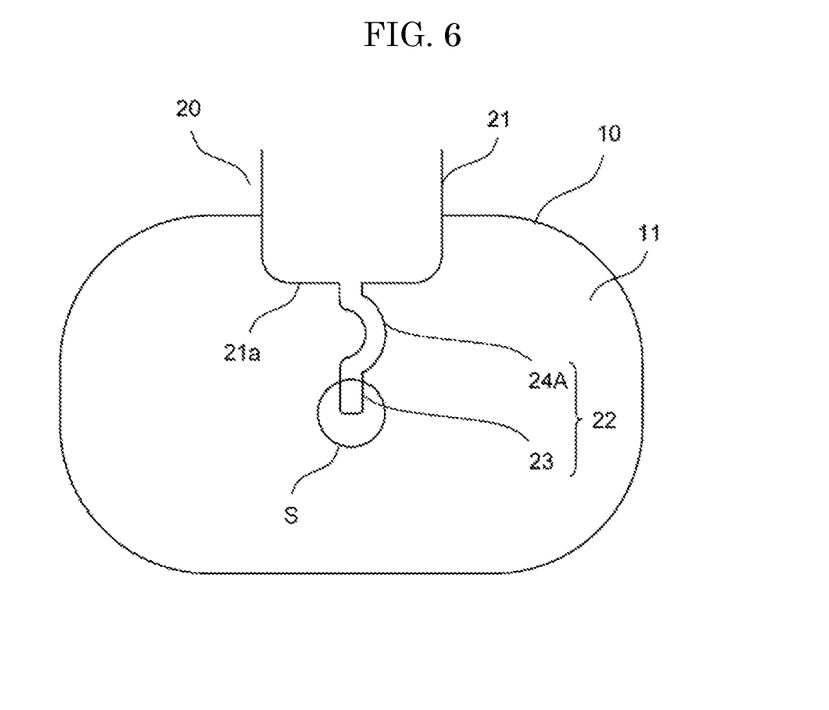
FIG. 6 is a diagram for illustrating a configuration of an electrode connection terminal part according to another modification.

In the above-described exemplary embodiment, electrode connection terminal part 22 is provided with elastic shape part 24 having a triangular wavy shape undulating in a front-rear direction. However, an elastic shape part with any shape may be provided as long as elastic deformation occurs along a direction in which bus bar main body 21 extends or shrinks. For example, as shown in FIG. 6, electrode connection terminal part 22 may be provided with elastic shape part 24A having an arc shape expanding in a front-rear direction. Alternatively, the elastic shape part may have an S-shaped wave shape undulating in a front-rear direction, a U-shape expanding in a front-rear direction.

In the above-described exemplary embodiment, elastic shape part 24 has a shape undulating in a front-rear direction, i.e. a direction parallel to the surface of end-face electrode 11 and perpendicular to a direction in which electrode connection terminal part 22 extends. However, elastic shape part 24 may have a shape undulating in a left-right direction, i.e. a direction perpendicular to the surface of end-face electrode 11 and perpendicular to a direction in which electrode connection terminal part 22 extends. Similarly, elastic shape part 24A may have a shape expanding in a left-right direction, i.e. a direction perpendicular to the surface of end-face electrode 11 and perpendicular to a direction in which electrode connection terminal part 22 extends.

Figure 7A:
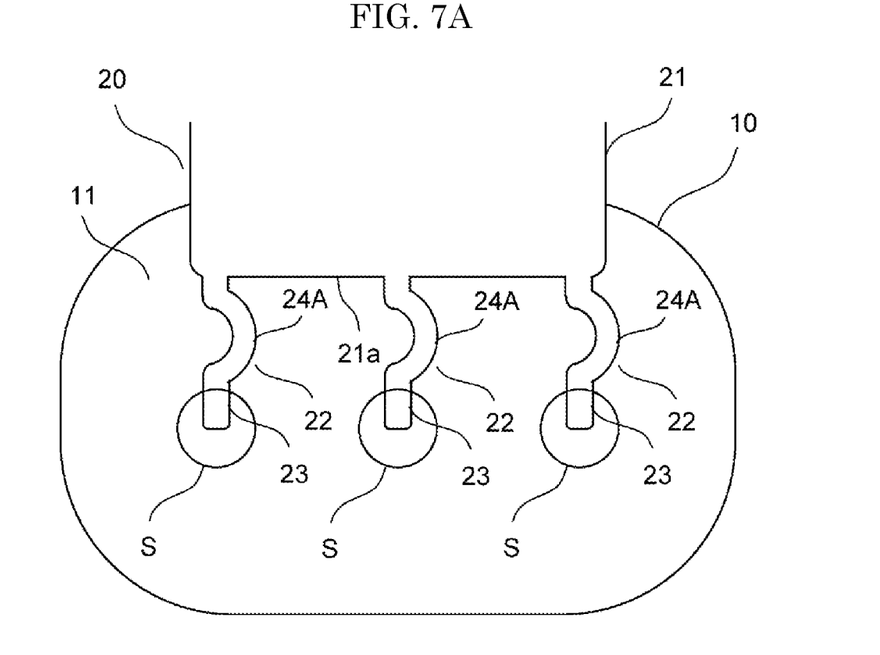
FIGS. 7A and 7B are diagrams for each illustrating a configuration of an electrode connection terminal part according to another modification.

Further, in the above-described exemplary embodiment, electrode connection terminal part 22 is provided only at a center of lower edge part 21a of bus bar main body 21 in a front-rear direction. However, electrode connection terminal part 22 may be provided not only at the center of lower edge part 21a of bus bar main body 21 in a front-rear direction, but also at both ends of lower edge part 21a in a front-rear direction as in FIG. 7A.

Figure 7B:
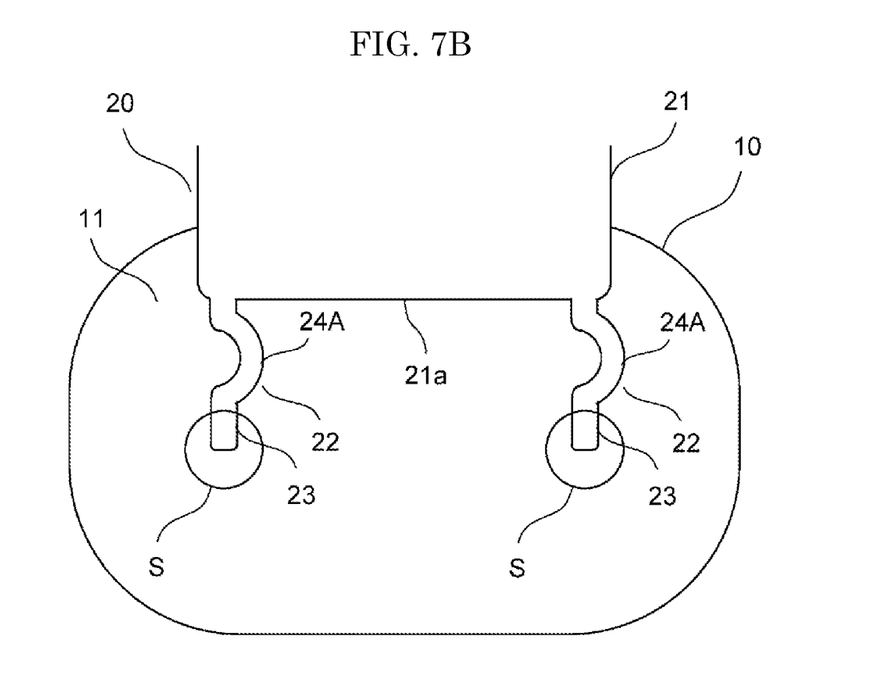

Further, in addition to one electrode connection terminal part 22 at the center of lower edge part 21a of bus bar main body 21 in a front-rear direction, two electrode connection terminal parts 22 may be provided at positions symmetrical to each other with respect to the center in a front-rear direction, such as both ends of lower edge part 21a as in FIG. 7B. In this way, bending stress is unlikely to be generated on a root portion of each of three electrode connection terminal parts 22 during extension or shrinkage of bus bar main body 21 as in a case where one electrode connection terminal part 22 is provided at the center.

Further, in the above-described exemplary embodiment, end-face electrode 11 of capacitor element 10 is partially covered with the lower part of bus bar main body 21. However, a configuration may be employed in which lower edge part 21a of bus bar main body 21 is positioned slightly above capacitor element 10 while the lower part of bus bar main body 21 does not cover a part of end-face electrode 11 of capacitor element 10.

Further, in modification 1, first flat plate part 55 of bus bar main body 51 may be formed in such a manner that first flat plate part 55 is long in a direction along which first flat plate part 55 and electrode connection terminal part 52 are arranged.

Further, a number of capacitor elements 10 present in film capacitor 1 can be appropriately changed according to a required electric capacitance.

Further, in the above-described exemplary embodiment, capacitor element 10 is formed by stacking two metalized films with aluminum vapor-deposited on a dielectric film, and winding or laminating the stacked metalized films. Alternatively, capacitor element 10 may be formed by stacking a metalized film with aluminum vapor-deposited on both surfaces of a dielectric film and an insulating film, and winding or laminating the stacked films.

Further, in the above-described exemplary embodiment, film capacitor 1 is described as an example of the capacitor of the present disclosure. However, the present disclosure can also be applied to capacitors other than film capacitor 1. The present disclosure can also be applied to so-called caseless capacitors in which there is no case and a mold resin covering a capacitor element forms an outer shell of the capacitor.

In addition, various changes can be made to the exemplary embodiment of the present disclosure as appropriate within technical ideas described in claims.

In the exemplary embodiment described above, terms indicating directions, such as "upward" and "downward", mean relative directions that depend only on relative positional relationships of constituent members, and do not mean absolute directions such as a vertical direction and a horizontal direction.

The present disclosure is useful for capacitors to be used for various electronic apparatuses, electric apparatuses, industrial apparatuses, electric components for vehicles, and the like, and useful for manufacturing the capacitors.

What is claimed is:

1. A capacitor comprising:
a capacitor element having an end surface and a peripheral surface;
an electrode disposed on the end surface; and
a bus bar made of a metal and connected to the electrode, wherein:
  the bus bar includes a bus bar main body and at least one electrode connection terminal part provided at an edge part of the bus bar main body, the edge part being at a side close to the electrode,
  the at least one electrode connection terminal part has a width smaller than a width of the bus bar main body and extends from the edge part in a first direction parallel to a surface of the electrode,
  the at least one electrode connection terminal part includes a connecting part and an elastic shape part, the connecting part being connected to the electrode at a tip of the at least one electrode connection terminal part, the elastic shape part being disposed between the edge part and the connecting part,
  the elastic shape part has a shape that is elastically deformable so that the elastic shape part shrinks along a direction in which the edge part approaches the connecting part in accordance with thermal expansion of the bus bar main body, and the elastic shape part extends along a direction in which the edge part moves away from the connecting part in accordance with thermal shrinkage of the bus bar main body,
  the bus bar main body includes a first part that includes at least the edge part and extends in a direction parallel to a surface of the electrode, and
  a longitudinal direction in which the first part extends is parallel to a direction between (1) a point on the edge part and (2) the connecting part, the point on the edge part being a location on the edge part at which the elastic shape part is connected to the edge part of the bus bar main body.

2. The capacitor according to claim 1, wherein the elastic shape part has a shape undulating or expanding in a direction crossing the first direction.

3. The capacitor according to claim 1, wherein:
the at least one electrode connection terminal part is provided at a central position of the edge part in a second direction parallel to the surface of the electrode and perpendicular to the first direction, and
the at least one electrode connection terminal part is further provided at least one of two positions symmetrical to each other with respect to the central position in the second direction.

4. The capacitor according to claim 1, wherein:
the connecting part is fixed to the electrode by solder, and
the elastic shape part is not in contact with the solder.

5. The capacitor according to claim 1, further comprising:
a case housing the capacitor element; and
a mold resin filled in the case,
wherein the bus bar main body includes an external connection terminal part on a plane flush with the edge part, the external connection terminal part being exposed from the mold resin and configured to be connected to an external terminal.

6. The capacitor according to claim 1, further comprising:
a case housing the capacitor element; and
a mold resin filled in the case, wherein:
the bus bar main body includes a first flat plate part, a second flat plate part, and a third flat plate part,
the first flat plate part includes the edge part and covers the electrode,
the second flat plate part bends with respect to the first flat plate part and extends along the peripheral surface of the capacitor element, and
the third flat plate part bends with respect to the second flat plate part and extends away from the peripheral surface of the capacitor element to have a part exposed from the mold resin.

* * * * *